United States Patent
Books et al.

(10) Patent No.: US 8,639,403 B2
(45) Date of Patent: Jan. 28, 2014

(54) MODULARIZED HYBRID POWER TRAIN CONTROL

(75) Inventors: Martin T. Books, Columbus, IN (US); Zachary Schwab, Columbus, IN (US); Vivek Anand Sujan, Columbus, IN (US); Praveen Muralidhar, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 351 days.

(21) Appl. No.: 12/981,104

(22) Filed: Dec. 29, 2010

(65) Prior Publication Data

US 2012/0173058 A1    Jul. 5, 2012

(51) Int. Cl.
*B60W 20/00* (2006.01)

(52) U.S. Cl.
USPC .................................. 701/22; 701/1

(58) Field of Classification Search
USPC .......................... 701/22; 180/65.265; 903/930
See application file for complete search history.

(56) References Cited

U.S. PATENT DOCUMENTS

| | | | |
|---|---|---|---|
| 5,841,201 A | 11/1998 | Izumi et al. | |
| 6,158,405 A * | 12/2000 | Masberg et al. | 123/192.1 |
| 6,164,400 A | 12/2000 | Jankovic et al. | |
| 6,202,776 B1 * | 3/2001 | Masberg et al. | 180/65.22 |
| 6,378,636 B1 | 4/2002 | Worrel | |
| 6,405,701 B1 * | 6/2002 | Masberg et al. | 123/192.1 |
| 6,484,832 B1 | 11/2002 | Morisawa et al. | |
| 6,487,998 B1 * | 12/2002 | Masberg et al. | 123/192.1 |
| 6,512,967 B2 | 1/2003 | Ostberg et al. | |
| 6,853,893 B2 | 2/2005 | Corcione et al. | |
| 6,862,511 B1 | 3/2005 | Phillips et al. | |
| 6,907,337 B2 | 6/2005 | Phillips et al. | |
| 6,973,981 B2 | 12/2005 | Stummer | |
| 7,024,140 B2 | 4/2006 | Masuda et al. | |
| 7,275,610 B2 | 10/2007 | Kuang et al. | |
| 7,317,295 B2 | 1/2008 | Izumi et al. | |
| 7,421,321 B2 | 9/2008 | Breed et al. | |
| 7,758,468 B2 | 7/2010 | Vafidis et al. | |
| 7,801,653 B2 | 9/2010 | Sheidler et al. | |
| 7,826,939 B2 | 11/2010 | Liu et al. | |
| 8,060,267 B2 | 11/2011 | Tamai et al. | |
| 8,103,395 B2 | 1/2012 | Bissontz | |
| 8,126,604 B2 | 2/2012 | McGrogan et al. | |
| 8,204,639 B2 | 6/2012 | Jinno et al. | |
| 2004/0099454 A1 | 5/2004 | Hughes | |
| 2004/0174124 A1 | 9/2004 | Wilton et al. | |
| 2008/0236921 A1 | 10/2008 | Huseman | |
| 2009/0215586 A1 | 8/2009 | Kresse | |

(Continued)

FOREIGN PATENT DOCUMENTS

DE    102006019031 A1    10/2007
FR    2966411    4/2012

*Primary Examiner* — Yonel Beaulieu
(74) *Attorney, Agent, or Firm* — Krieg DeVault LLP (57) ABSTRACT

A method includes manufacturing a first assembly having an application requirements module that interprets a contemporaneous performance specification, and an energy partitioning module that provides an electric motor torque target, a battery power flux target, and an internal combustion engine torque target. The method further includes manufacturing a second assembly having an engine control module that controls an internal combustion engine in response to the internal combustion engine torque target. The method includes integrating the first assembly and the second assembly with a third assembly to form a completed hybrid power train, where the third assembly includes a datalink that receives the internal combustion engine torque target from the first assembly and provides the internal combustion engine torque target to the second assembly.

28 Claims, 5 Drawing Sheets

(56) References Cited

U.S. PATENT DOCUMENTS

| | | |
|---|---|---|
| 2010/0078234 A1 | 4/2010 | Bissontz |
| 2010/0082192 A1 | 4/2010 | Hofbauer |
| 2011/0083309 A1 | 4/2011 | Kshatriya |
| 2011/0083918 A1 | 4/2011 | Kshatriya |
| 2011/0087392 A1 | 4/2011 | Kshatriya |
| 2011/0125390 A1 | 5/2011 | Bellinger et al. |
| 2011/0153128 A1 | 6/2011 | Wright et al. |
| 2011/0224858 A1 | 9/2011 | Bissontz |
| 2011/0224877 A1 | 9/2011 | Faucett et al. |
| 2011/0231045 A1 | 9/2011 | Bissontz |
| 2011/0231046 A1 | 9/2011 | Bissontz |
| 2012/0010767 A1 | 1/2012 | Phillips et al. |
| 2012/0035796 A1 | 2/2012 | Jeon et al. |
| 2012/0046812 A1 | 2/2012 | Sujan et al. |
| 2012/0158225 A1 | 6/2012 | Books et al. |
| 2012/0167554 A1* | 7/2012 | Zhang et al. .................. 60/274 |

* cited by examiner

MODULARIZED HYBRID POWER TRAIN CONTROL

BACKGROUND

The technical field generally relates to control systems for hybrid power trains. Hybrid power trains utilize more than one power source to generate the torque and power needed to meet the current demands for the application in which the hybrid power train is installed. The installed hybrid power train includes the first power source (e.g. an internal combustion engine), the second power source (e.g. an electric motor/generator and associated battery pack), and the application in which the hybrid power train is positioned and interfaced. The entire system may further include interfacing hardware, electronic controllers, linking networks and electrical components, an engine compartment, a vehicle body, a transmission, etc.

Various portions of the entire system may be provided by different manufacturers, and/or may be manufactured at varying locations or manufacturing times. The control of various portions of the hybrid power train may be distributed between manufacturers, and/or distributed between various computing devices and hardware across the system. The control of various portions of the hybrid power train may further be integrated with devices outside of the system that includes the power sources and the electronics integrating the power sources.

Non-limiting distribution examples include controls for the internal combustion engine provided with the engine by a first manufacturing entity, controls for an electric portion of the hybrid power train provided by a second manufacturing entity, and installation of the power sources into a vehicle provided by a third manufacturing entity. Another distribution example includes a first manufacturer providing engine controls and interfacing to the application, with a second manufacturer providing controls for the electric portion of the hybrid power train. Any distribution of the controls and hardware can present control interface challenges in certain circumstances.

A hybrid power train system requires, generally, a determination of the total torque and/or power requirement for the powered application, a determination of the contributions of the available power sources that will be provided to meet the total torque and/or power requirement, and finally control of the individual power sources to meet the determined individual contributions. Applications where a number of manufacturing entities provide different portions of the entire system, interfaces are created within the control system for the hybrid power train system. For example, the determination of the total torque and/or power requirement is generally provided by a device outside of the hybrid power train system and communicated to the hybrid power train system—for example from an accelerator pedal, a cruise control switch, a PTO switch, or a similar device.

When a first control element that determines the total torque and/or power requirement is on a separate electronic device from a second control element that determines the contributions of the available power sources, the total torque and/or power requirement must be communicated to the second electronic device over a datalink or other network device. The second control element may be on a separate electronic device from a third control element that provides specific engine control to meet the engine contribution portion of the total torque and/or power requirement, and/or on a separate electronic device from a fourth control element that provides specific motor/generator control to meet the electric side contribution of the total torque and/or power requirement. Additionally, a fifth control element may be present to determine energy flux requirements within the electric side, including charging or discharging of the battery pack, the available current and power capacities of the motor or generator, etc. The fifth control element may likewise be on a separate electronic device from one or more of the other control elements, requiring further datalink communications.

Each situation where control elements are provided on separate computing devices, a potential lag period is introduced within the control loop. For example, the first control element determines a total torque requirement which passes to the second control element over a datalink with a lag, in a nominal case, of up to about 20 ms. The second control element determines the torque partitioning, and passes the internal combustion engine portion of the torque requirement introducing another lag of about 20 ms. Additionally, the initial torque requirement may have been communicated to the first control element via a datalink (e.g. with an accelerator pedal position published on a datalink rather than hardwired into the controller), providing additional lag between the torque request and final response.

Further, because control elements may be executing at different execution rates, the age of the information between control elements may be somewhat variable. For example, where the first control element publishes the total torque requirement to the datalink each 15 msec, and the second control element reads the total torque requirement from the datalink each 10 msec, the second control element will receive information having a delay with a beat pattern where some data is relatively new and other data is relatively stale.

Accordingly, each datalink interface introduced into the entire system control loop (i.e. from the application overall torque request until the final commands to all hardware elements) degrades the performance and responsiveness of the system. The degradation can be managed by methods known in the art, for example by introducing synchronous datalink communications such that control elements provide information according to a schedule and/or with time information included within the communications. However, synchronous communications are more complex and require additional costs in the system design and hardware requirements. Additionally, the use of synchronous communications also requires agreement among the designers of the various control elements. The degradation can also be avoided by removing datalink communications from the system and including all control elements within the same hardware computing device. However, the inability to provide distributed control elements requires that all manufacturing entities have access to the controller, which may introduce conflicts in control and ownership of the content of the final controller. The inability to provide distributed control elements across hardware devices may also introduce complications in manufacturing and limitations in final application design. Further, it may be difficult or impractical to coordinate all manufacturing entities to create software control elements that are compatible, that meet requirements for memory consumption in storage and in real-time operation, that use the correct data types, that are delivered on time and in the correct versions, etc.

Datalink communication lags may also be managed by providing dedicated hardware communications. For example, a first hardware device may provide an output voltage that is wired directly to a second hardware device accepting in input voltage. The communicated parameter is provided by an agreed upon schedule of the output voltage to the communicated parameter value. A sensor connected to the hardware device is a common example of such a hardwired communication. However, hardwired communications are generally undesirable because they introduce costs due to manufacturing, the implementation of standards for connectors and wires, risks to the reliability of the system, and competition for the generally limited number of input and output pins (or other I/O hardware) available on hardware computing devices.

It is also desirable that a hybrid power train, or portions of a hybrid power train, be capable of being installed in a range of applications, where the range of applications include a range of control capabilities. For example, a manufacturer may develop a highly capable second control element to determine the power distribution between the engine and the electric side, but rely upon a base hybrid power train controller to control other aspects of the system. Additionally, it is desirable that a hybrid power train be capable of being flexible over time without the entire control system requiring replacement when a different control burden is placed on the hybrid power train. For example, a manufacturer of an application may develop an intelligent transmission that determines the total torque and/or power requirement for the application, and it is desirable that the application can be upgraded with the intelligent transmission without requiring a complete change of the hybrid power train control. Further, the manufacturer may wish to intermittently provide control input, for example determining the battery state-of-charge requirement when transient city driving is detected, but at other times allow a base control scheme to control the application.

Therefore, further technological developments are desirable in this area.

SUMMARY

One embodiment is a unique system to provide distributed and configurable control for a hybrid power train system. Further embodiments, forms, objects, features, advantages, aspects, and benefits shall become apparent from the following description and drawings.

DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
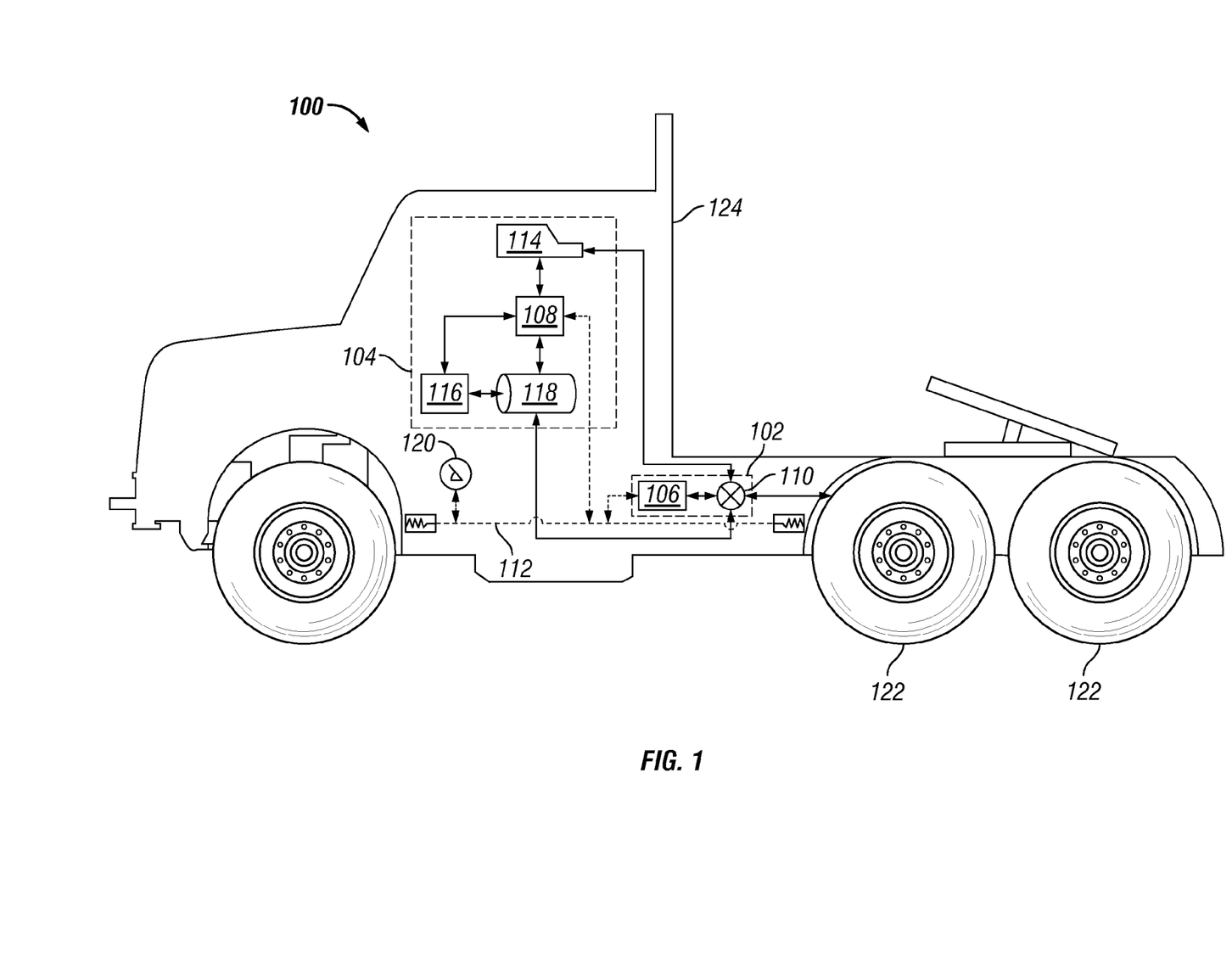
FIG. 1 is a schematic block diagram of a first, second, and third assembly.

FIG. 1 is a schematic block diagram of a first, second, and third assembly. The exemplary system 100 is described using an internal combustion engine 114 and an electric motor 118 to form a hybrid power train. However, certain embodiments of the system 100 may utilize any power sources to form the hybrid power train, including hydraulic or other power sources. Likewise, the exemplary system 100 includes a battery pack 116 that stores energy and provides operation flexibility. However, any energy storage device known in the art is also contemplated herein, including without limitation an ultra-capacitor or hyper-capacitor, a pressure storage vessel, a mechanical storage component such as a flywheel or spring.

The system 100 includes an internal combustion engine 114 operatively coupled to a power splitter 110 and an electric motor 118 operatively coupled to the power splitter 110. The engine 114 and electric motor 118 combine to form a hybrid power train. The system includes a battery pack 116 that exchanges power with the electric motor 118. The power splitter 110 exchanges mechanical energy with a load 122, illustrated as the drive wheels of a vehicle 124 in the example of FIG. 1. The hybrid power train in FIG. 1 is illustrated as a parallel power configuration, but any hybrid power train configuration known in the art is contemplated herein. The electric motor 118 may be a motor/generator, and/or the system 100 may include a separate motor and generator. The engine 114 may have a direct link to an electric generator, and/or the engine 114 may selectively provide power to the electric generator through the power splitter 110. The power splitter 110 may be a transmission or any other device or group of devices understood in the art that transfers mechanical energy between the engine 114, the motor 118, and the load 122.

The system 100 includes a first electronic controller 106 and a second electronic controller 108. The controllers 106, 108 are in communication with a datalink 112. The datalink 112 may be a controller-area network (CAN) or any other type of datalink understood in the art. The system 100 includes a first assembly 102 having the first electronic controller 106 positioned at a first manufacturing facility (not shown) and a second assembly 104 having the second electronic controller 108 positioned at a second manufacturing facility (not shown). The third assembly 124 receives the first assembly 102 and the second assembly 104 to form a completed hybrid power train. The third assembly 124 is positioned at a third manufacturing facility (not shown).

In certain embodiments, the system 100 further includes one or more controllers 106, 108 that perform certain operations to control the hybrid power train. In certain embodiments, the controllers 106, 108 forms a portion of a processing subsystem including one or more computing devices having memory, processing, and communication hardware. The controllers 106, 108 may each be a single device or a distributed device, and the functions of the controllers 106, 108 may be performed by hardware or software.

In certain embodiments, the controllers 106, 108 include one or more modules structured to functionally execute the operations of the controllers 106, 108. In certain embodiments, the controller includes an. The description herein including modules emphasizes the structural independence of the aspects of each controller 106, 108, and illustrates one grouping of operations and responsibilities of each controller 106, 108. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the sections referencing FIG. 3 and FIG. 4.

An exemplary embodiment of the system 100 includes an application requirements module positioned on the first electronic controller 106, an energy partitioning module and an engine control module positioned on the second electronic controller 108, where the datalink 112 is a controller-area network. The application requirements module interprets a contemporaneous performance specification, the energy partitioning module determines the fraction of a total output to be provided by the engine 114 and the motor 118, and the engine control module provides specific engine commands to meet the engine portion of the total output.

The exemplary system includes a torque requesting device 120 that provides the contemporaneous performance specification. The torque requesting device 120 is an operator accelerator pedal in the example of FIG. 1, and the contemporaneous performance specification is provided to the first controller 106 and/or the second controller 108 over the datalink 112. However, the torque requesting device 120 may be hardwired into one or more of the controllers 106, 108. The system 100 may have any other type of load requesting device to provide the contemporaneous performance specification to the application requirements module.

In certain embodiments, the contemporaneous performance specification is a torque output requirement for the hybrid power train, where the torque output requirement is determined, directly or indirectly, from the torque requesting device 120 or other signal. In certain embodiments, the torque output requirement is an operator torque demand. Other exemplary devices to provide a contemporaneous performance specification, or to provide other data from which the contemporaneous performance specification can be calculated, include a cruise control device (e.g. providing a vehicle set speed), a PTO control device (e.g. providing a power splitter 110 output shaft set speed), and/or an intelligent transmission providing a specific power, speed, or torque request.

Figure 2:
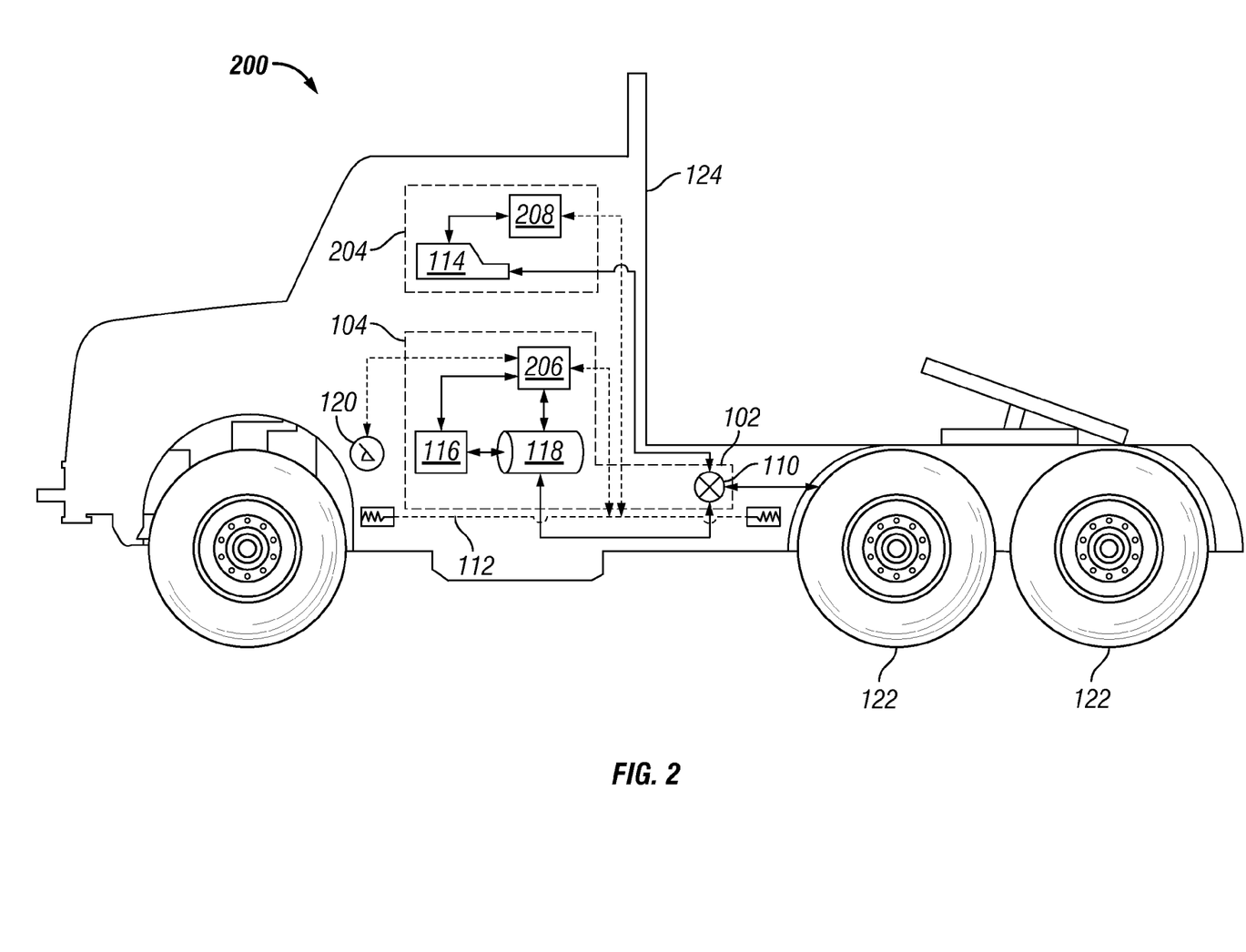
FIG. 2 is a schematic block diagram of an alternate embodiment of the first, second, and third assembly.

FIG. 2 is a schematic block diagram of an alternate embodiment of the first, second, and third assembly. The exemplary system 200 includes a first electronic controller 206 as a part of a first assembly 202, and a second electronic controller 208 as a part of a second assembly 204. The first assembly 202 is positioned at a first manufacturing facility (not shown), the second assembly 204 is positioned at a second manufacturing facility (not shown), and the system 200 includes a third assembly 124 that receives the first assembly and the second assembly to form a completed hybrid power train, where the third assembly 124 is positioned at a third manufacturing facility (not shown). The first electronic controller 206 includes the application requirements module and the energy partitioning module, and the second electronic controller 208 includes the engine control module.

Figure 3:
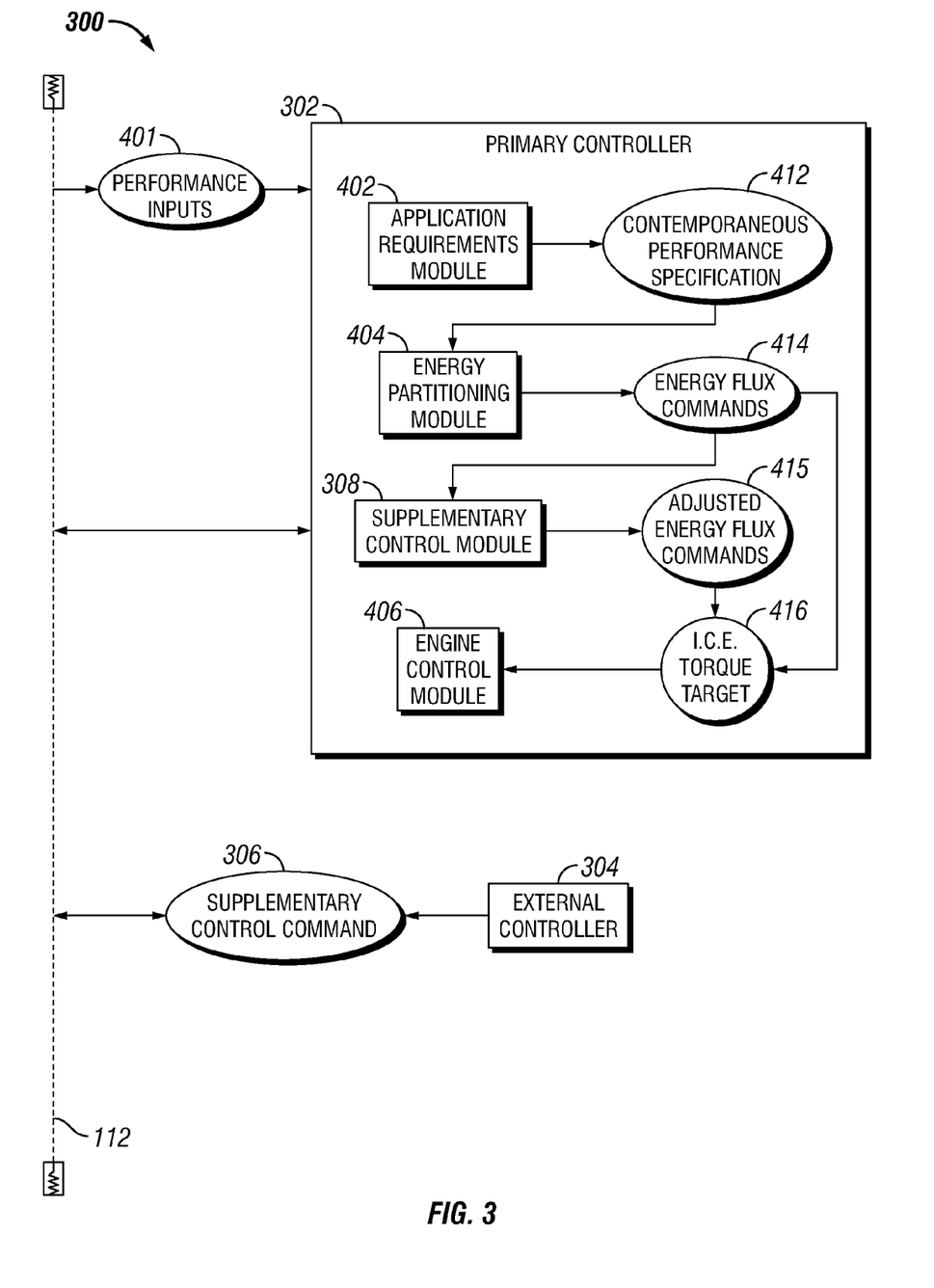
FIG. 3 is a schematic block diagram of a primary controller and an external controller.
Figure 4:
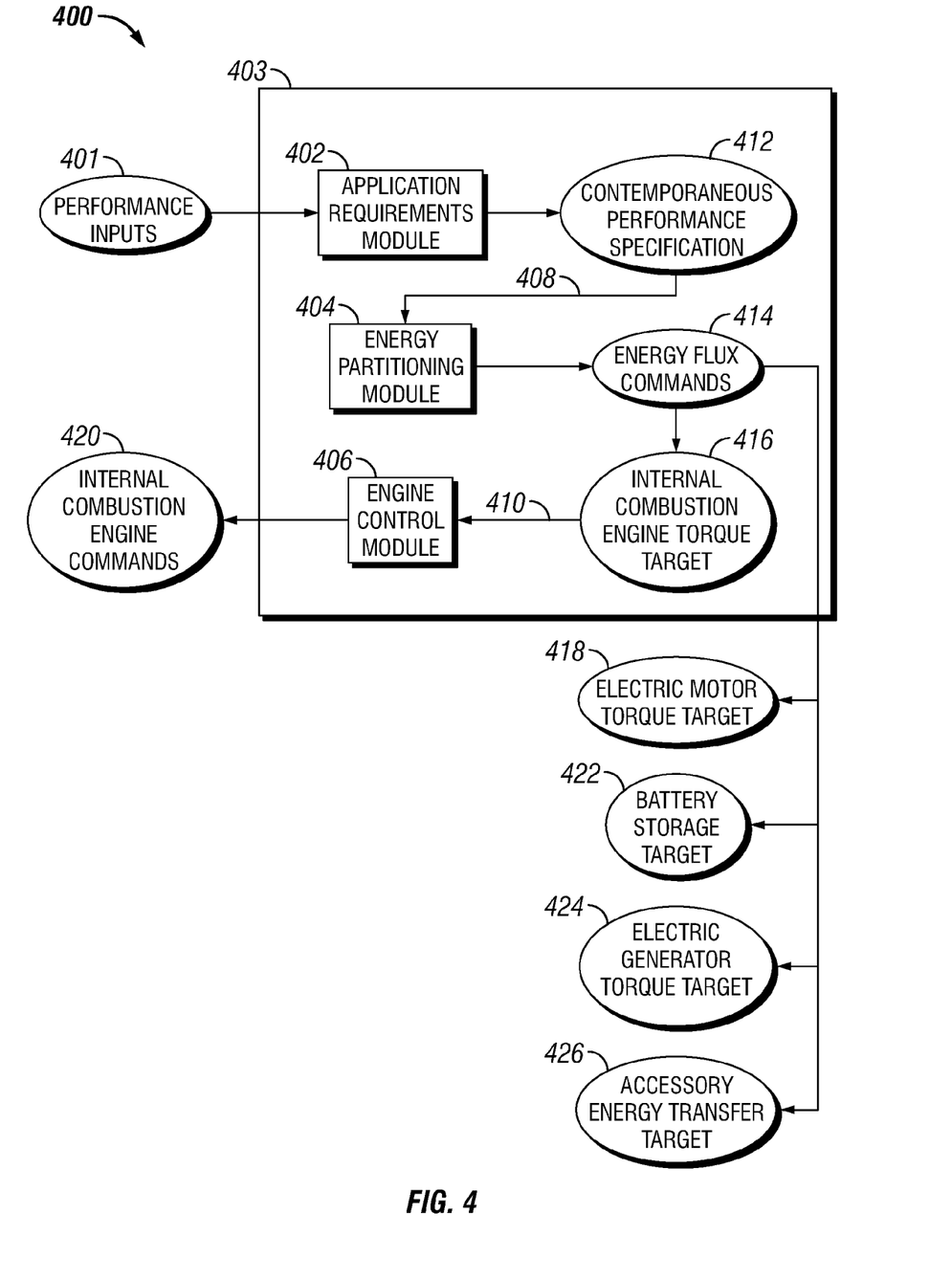
FIG. 4 is a schematic block diagram of a controller for a hybrid power train.

FIGS. 3 and 4 are schematic block diagrams of exemplary organizations of modules for performing operations to control a hybrid power train system. FIG. 3 illustrates a primary controller 302 and an external controller 304, wherein the controllers 302, 304 communicate over a datalink 112. FIG. 4 illustrates a processing subsystem 403 having one or more controllers.

Certain operations of modules herein are described as interpreting a data value. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

FIG. 3 is a schematic block diagram of a primary controller 302 and an external controller 304 as part of a processing subsystem 300. The primary electronic controller 302 is in communication with the external electronic controller 304 over a datalink 112. The external electronic controller 304 provides a supplementary control command 306 to the datalink 112. Specific, non-limiting, examples of the external electronic controller 304 include a pump controller (e.g. for a PTO-driven pump), a brake controller, a collision avoidance controller (e.g. for a radar-driven cruise control system), and/or a PTO device controller.

The supplementary control command 306 is any command which provides a torque, speed, or power request or requirement for the electric motor, motor/generator, or internal combustion engine. Exemplary supplementary control commands 306 include one or more of, without limitation, a torque target for one of the torque devices, a power target for one of the torque devices, a minimum torque value for one of the torque devices, a maximum torque value for one of the torque devices, a minimum battery state-of-charge (SOC), a maximum battery SOC, and a battery target SOC.

The source of information for the external electronic controller 304 to determine the supplementary control command 306 is from any torque or power input request device. Exemplary torque or power input request devices include an accelerator pedal, a cruise control switch, a PTO operation switch, a load anticipating device, and/or a transmission torque communication. Exemplary load anticipating devices include, without limitation, a load anticipated from a GPS device anticipating a hill, from a plant operation device anticipating that a pumping or heating requirement for a process is going to increase, and a transmission anticipating an imminent load as a gear is re-engaged.

The torque or power input request device may be from the same signal, or from a parallel signal from the same device, as the device that provides the performance inputs 401 to the primary controller 302 for determination of the contemporaneous performance specification 412. For example, the external controller 304 and the primary controller 302 may both utilize an accelerator pedal position, either from the same sensor on the accelerator pedal, or from separate sensors on the accelerator pedal where both sensors are constructed to provide the accelerator pedal position. The performance inputs 401 provided to the primary controller 302, in the illustration of FIG. 3, are provided over the datalink 112. However, the performance inputs 401 are made available to the primary controller 302 in any manner known in the art, including without limitation from a hard-wired sensor to the primary controller 302 such as an accelerator pedal position sensor or a cruise control switch position sensor.

The primary electronic controller 302 includes an application requirements module 402, an energy partitioning module 404, a supplementary control module 308, and an engine control module 406. The application requirements module 402 interprets a contemporaneous performance specification 412, which may be received directly or interpreted from one or more performance inputs 401. The contemporaneous performance specification 412 is a temporally current description of a total performance output required for the hybrid power train. The performance output may be a speed requirement (e.g. an engine speed, transmission speed, vehicle speed, PTO shaft speed, etc.), a torque requirement at any specified component, and/or a power requirement at any specified component.

The energy partitioning module 404 provides energy flux commands 414 in response to the contemporaneous performance specification 402. A first one of the energy flux commands 414 is an internal combustion engine torque target 416, although the energy flux commands may include any other energy flow information in the system, including an electric motor torque command, a motor/generator torque command, and/or a battery charging (or discharging) rate command.

The supplementary control module 308 interprets the supplementary control command 306 and adjusts the contemporaneous performance specification 412 and/or the energy flux commands 414 in response to the supplementary control command 306. The exemplary supplementary control module 308 provides an adjusted energy flux command(s) 415. The engine control module 406 controls an internal combustion engine in response to the internal combustion engine torque target.

The adjusted energy flux commands 415 are provided by replacing, adjusting, or considering the supplementary control command 306. In one example, the supplementary control command 306 is provided as minimum torque limit for the engine and/or electric motor, and the minimum torque limit is applied to the energy flux commands 414. The supplementary control module 308 may not adjust the final output of the energy flux commands 414, for example where the request of the supplementary control command 306 is already met by the base energy flux command 414.

In certain embodiments, the supplementary control command 306 provides a protective limit command, as a torque, speed, or power command for one of the engine, motor, or motor/generator, and the supplementary control module 308 adjusts the energy flux commands 414 based upon the protective limits. Where limit values and/or protective limit values are provided with the supplementary control command 306, the limit values may further include priority values. The priority values allow the system to provide graduated response according to values that are required to meet operator demand, values required for emissions, values required for safety purposes, or for any other priority scheme understood in the art. In certain embodiments, limits are enforced without prioritization, for example with any protective limit value enforced over a limit value, and any limit value enforced over the base energy flux commands 414 determined in the absence of any limits.

In certain embodiments, the datalink 112 is an asynchronous datalink. As is known in the art, devices communicating with an asynchronous datalink provide periodic reports to, and reads from, the datalink without regard to the specific time of the report/read operation, and without time information embedded within the communication. In certain embodiments, one or more of the energy flux commands 414, the contemporaneous performance specification 412, and/or the supplementary control command 306 is updated at a rate greater than or equal to 50 Hz (or 20 ms).

FIG. 4 is a schematic block diagram of a processing subsystem 403 having one or more controllers for a hybrid power train. The subsystem 403 includes an application requirements module 402 that interprets a contemporaneous performance specification 412. The subsystem 403 interprets the contemporaneous performance specification 412 by receiving the contemporaneous performance specification 412 directly as an input, and/or by calculating the contemporaneous performance specification 412 in response to one or more performance inputs 401. Exemplary performance inputs include a current accelerator pedal position, one or more a cruise control switch position, and one or more PTO control inputs. The application requirements module 402 may further consider the current engine speed and load (or torque output), emissions requirements, vehicle speed, or any other parameters understood in the art that affect the desired performance output of the hybrid power train.

The subsystem 403 further includes an energy partitioning module 404 that provides a number of energy flux commands 414 in response to the contemporaneous performance specification 412. The energy flux commands 414 include an internal combustion engine torque target 416, and may further include one or more of an electric motor torque target 418, a battery storage target 422, an electric generator torque target 424, and/or an accessory energy transfer target 426. Any operations of a hybrid power train understood in the art may be described in the energy flux commands 414. For example, a motor/generator may operate in a motoring or generating mode, with a positive or negative torque, according to the energy flux commands 414. The battery of the system may charge or discharge in accordance with a current SOC and with the battery storage target 422. A device (e.g. a hydraulic or electric clutch) may engage accessory devices to increase a load on the system or to recover kinetic energy from a moving vehicle, in which the hybrid power train is installed, in accordance with the accessory energy transfer target 426.

The exemplary subsystem 403 further includes an engine control module 406 that controls an internal combustion engine in response to the internal combustion engine torque target 416, for example by providing internal combustion engine commands 420. The subsystem 403 further includes a datalink 408, 410 positioned between two control elements of the system. The datalink 408, in a first embodiment, is interposed between the application requirements module 402 and the energy partitioning module 404. The contemporaneous performance specification 412, describing the presently desired torque, speed, or power output of the hybrid power train, is passed on the datalink 408 in the first embodiment.

The datalink 410, in a second embodiment, is interposed between the energy partitioning module 404 and the engine control module 406. The internal combustion engine torque target 416, determined from the energy flux commands 414, is passed on the datalink 410 in the second embodiment. In a given embodiment, the datalink 408, 410 will be in only one of the described positions.

Communications between modules that do not occur on the datalink occur within a single hardware device, for example as software parameters communicated within RAM on computing device, or the communications occur on a hardware connection between devices that is essentially lag-free. For example, a communication can be provided as an output of a first hardware device that is a voltage, and as an input to second hardware device that reads the voltage, where the voltage is directly indicative of the communication. Accordingly, the voltage provides an essentially instantaneous communication of the parameter value without lag introduced by datalink communications.

In certain embodiments, the contemporaneous performance specification is updated at a rate greater than or equal to 50 Hz (i.e. 20 ms or faster), and the datalink 408, 410 is asynchronous. Certain additional or alternative embodiments include the contemporaneous performance specification 412 and/or the energy flux commands 414 updated at a rate greater than or equal to 50 Hz, where the datalink 408, 410 is asynchronous.

Figure 5A:
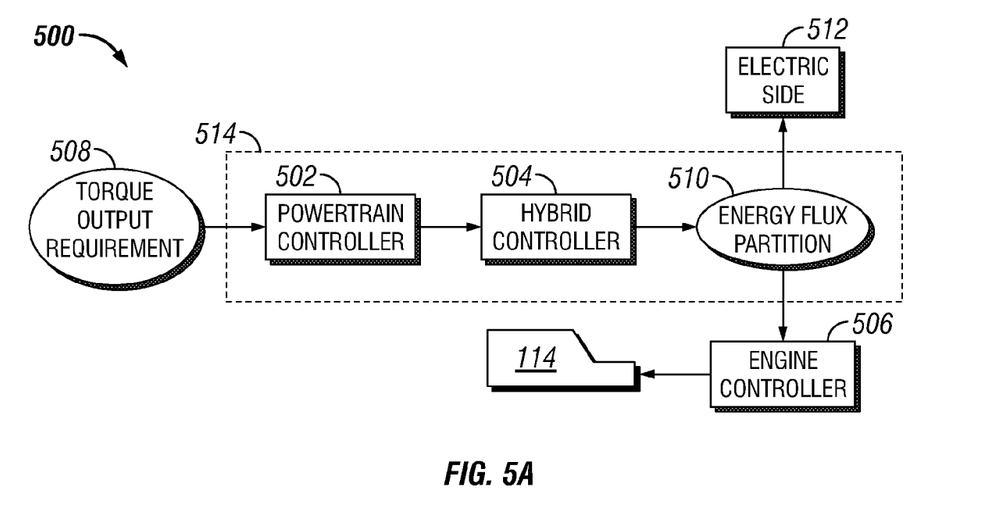
FIGS. 5A-5B are schematic block diagrams of controller systems for a hybrid power train system.

Referencing FIG. 5a a system includes a powertrain controller 502 that interprets a torque output requirement 508 for a hybrid power train system. The system further includes a hybrid controller 504 that determines an energy flux partition 510 for an internal combustion engine 114 and for an electric motor and/or an electric motor/generator (the electric side 512) in response to the torque output requirement 508. The system further includes an engine controller 506 that controls the engine 114 in response to the energy flux partition 510 for the internal combustion engine. The system 500 includes the hybrid controller 504 and the powertrain controller 502 within a single computing device 514. Communications to the engine controller 506 in the system 500 occur on a datalink, which may be an asynchronous datalink.

Figure 5B:
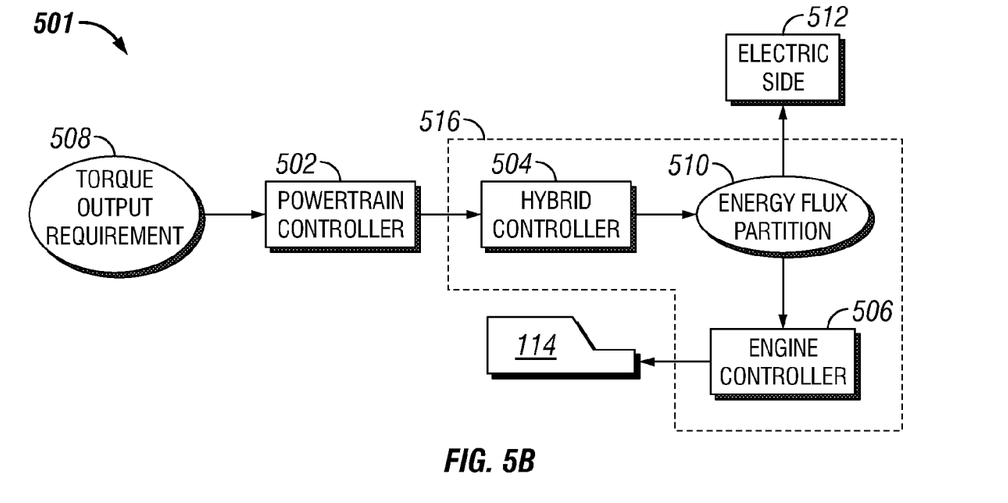

Referencing FIG. 5b, the system 501 includes the powertrain controller 502, the hybrid controller 504, and the engine controller 506. The system 501 includes the powertrain controller 502 and the engine controller 506 within a single computing device 516. Communications from the powertrain controller 502 in the system 501 occur on a datalink, which may be an asynchronous datalink.

It can be seen in FIGS. 5a and 5b that a complete serial execution cycle of the powertrain controller 502, the hybrid controller 504, and the engine controller 506 includes only one asynchronous datalink communication. The embodiments of FIGS. 5a and 5b allow the distribution of manufacture and control responsibility of various components of the system 500, 501, while allowing for high speed control of the engine 114 and electric side 512 that is responsive to rapid changes in the torque output requirement 508.

The schematic flow descriptions which follow provide an illustrative embodiment of performing procedures for controlling a hybrid power train. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

A procedure for controlling a hybrid power train includes an operation to interpret a contemporaneous performance specification for a hybrid power train, and an operation to provide a number of energy flux commands in response to the contemporaneous performance specification, where a first one of the energy flux commands includes an internal combustion engine torque target. The procedure further includes an operation to control an internal combustion engine in response to the internal combustion engine torque target, and an operation to communicate one (and only one) of the contemporaneous performance specification and the internal combustion engine torque target over a datalink. The procedure further includes, where the energy flux commands include an electric motor torque target and a battery power flux target, an operation to control an electric system in response to the electric motor torque target and the battery power flux target, where the electric motor torque target and the battery power flux target are not communicated over the datalink. In certain embodiments, the operation to interpret the contemporaneous performance specification includes an operation to determine a torque output requirement for the hybrid power train, where the torque output requirement may be an operator torque demand. An exemplary communicating operation includes an operation to provide an asynchronous message to the datalink.

The schematic flow descriptions which follow provide an illustrative embodiment of performing procedures for manufacturing a modular hybrid power train controller. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

An exemplary procedure includes an operation to manufacture a first assembly including an application requirements module and an energy partitioning module. The application requirements module interprets a contemporaneous performance specification, and the energy partitioning module provides an electric motor torque target, a battery power flux target, and an internal combustion engine torque target. The procedure further includes an operation to manufacture a second assembly that includes an engine control module. The engine control module controls an internal combustion engine in response to the internal combustion engine torque target. The procedure further includes an operation to integrate the first assembly and the second assembly with a third assembly to form a completed hybrid power train. The third assembly includes a datalink that receives the internal combustion engine torque target from the first assembly and provides the internal combustion engine torque target to the second assembly.

In certain embodiments, the completed hybrid power train includes an electric motor and the internal combustion engine, and the procedure further includes an operation of the electric motor in response to the electric motor torque target and an operation of the internal combustion engine in response to the internal combustion engine torque target. In certain embodiments, the datalink includes an asynchronous datalink. In certain embodiments, the completed hybrid power train includes an electric motor/generator and the internal combustion engine, and the procedure further includes an operation of the electric motor/generator in response to the electric motor torque target and the battery power flux target. The procedure still further includes an operation of the internal combustion engine in response to the internal combustion engine torque target.

As is evident from the figures and text presented above, a variety of embodiments according to the present invention are contemplated.

An exemplary set of embodiments is a system including an application requirements module that interprets a contemporaneous performance specification. The contemporaneous performance specification is a temporally current description of a total performance output required for a hybrid power train positioned in the system. The performance output may be a speed requirement (e.g. an engine speed, transmission speed, vehicle speed, PTO shaft speed, etc.), a torque requirement at any specified component, and/or a power requirement at any specified component. The system further includes an energy partitioning module that provides a number of energy flux commands in response to the contemporaneous performance specification. At least one of the energy flux commands is an internal combustion engine torque target.

The exemplary system further includes an engine control module that controls an internal combustion engine in response to the internal combustion engine torque target. The system further includes a datalink positioned between two control elements of the system. The datalink, in a first embodiment, is interposed between the application requirements module and the energy partitioning module. The datalink, in an alternate embodiment, is interposed between the energy partitioning module and the engine control module. In a given embodiment, the datalink will be in only one of the described positions. Communications between modules that do not occur on the datalink occur within a single hardware device, for example as software parameters communicated within RAM on computing device, or the communications occur on a hardware connection between devices that is lag-free. For example, a communication can be provided as an output of a first hardware device that is a voltage, and as an input to second hardware device that reads the voltage, where the voltage is directly indicative of the communication. Accordingly, the voltage provides an essentially instantaneous communication of the parameter value without lag introduced by datalink communications.

In certain embodiments, the datalink is interposed between the application requirements module and the energy partitioning module, and the contemporaneous performance specification passes to the energy partitioning module over the datalink. An alternate embodiment includes the datalink interposed between the energy partitioning module and the engine control module, where the internal combustion engine torque target passes to the engine control module over the datalink.

An exemplary embodiment of the system includes the application requirements module positioned on a first electronic controller, the energy partitioning module and the engine control module positioned on a second electronic controller, and where the datalink a controller-area network. A further embodiment includes a first assembly having the first electronic controller positioned at a first manufacturing facility, a second assembly having the second electronic controller positioned at a second manufacturing facility, and a third assembly that receives the first assembly and the second assembly to form a completed hybrid power train. The third assembly is positioned at a third manufacturing facility.

A manufacturing facility, as used herein, includes a position and/or time of manufacture. For example, two devices manufactured in two separate manufacturing buildings are manufactured at distinct manufacturing facilities. Two devices manufactured with a significant separation in time within the same manufacturing building are likewise manufactured at distinct manufacturing facilities. Two devices manufactured at separate assembly lines within the same manufacturing building may likewise be manufactured at distinct manufacturing facilities, for example where the lines are physically separated, where separate manufacturing teams are utilized, and/or where the manufacturing lines use separately secured areas. Separate manufacturing facilities are also provided for two assemblies in any situation where employees working for distinct ownership entities manufacture each of the assemblies, provided that the employees from the distinct ownership entities do not have co-extensive security authorizations with regard to the two assemblies.

The exemplary system further includes the application requirements module and the energy partitioning module positioned on a first electronic controller, and wherein the engine control module is positioned on a second electronic controller, and wherein the datalink comprises a controller-area network. Another exemplary embodiment of the system includes a first assembly having the first electronic controller positioned at a first manufacturing facility, a second assembly having the second electronic controller positioned at a second manufacturing facility, and a third assembly that receives the first assembly and the second assembly to form a completed hybrid power train, where the third assembly is positioned at a third manufacturing facility.

In certain embodiments, the contemporaneous performance specification is updated at a rate greater than or equal to 50 Hz (i.e. 20 ms or faster), and the datalink is asynchronous. Certain additional or alternative embodiments include the contemporaneous performance specification and/or the energy flux commands updated at a rate greater than or equal to 50 Hz, where the datalink is asynchronous.

In certain embodiments, the energy flux commands further include an electric motor torque target, where the system further includes an electric motor responsive to the electric motor torque target. In certain embodiments, the energy flux commands further include a battery storage target, an electric generator torque target, and/or an accessory energy transfer target.

Another exemplary set of embodiments is a system including a primary electronic controller in communication with an external electronic controller over a datalink, where the external electronic controller provides a supplementary control command to the datalink. The primary electronic controller includes an application requirements module, an energy partitioning module, a supplementary control module, and an engine control module. The application requirements module interprets a contemporaneous performance specification, and the energy partitioning module provides energy flux commands in response to the contemporaneous performance specification. A first one of the energy flux commands is an internal combustion engine torque target. The supplementary control module interprets the supplementary control command and adjusts the contemporaneous performance specification and/or the energy flux commands in response to the supplementary control command. The engine control module controls an internal combustion engine in response to the internal combustion engine torque target.

In certain embodiments, the datalink is an asynchronous datalink. In certain embodiments, one or more of the energy flux commands, the contemporaneous performance specification, and/or the supplementary control command is updated at a rate greater than or equal to 50 Hz. In certain embodiments, the external electronic controller includes a transmission controller, a pump controller, a brake controller, a collision avoidance controller, and/or a power take-off device controller.

Another exemplary set of embodiments is a method, including interpreting a contemporaneous performance specification for a hybrid power train, providing a number of energy flux commands in response to the contemporaneous performance specification, where a first one of the energy flux commands includes an internal combustion engine torque target, controlling an internal combustion engine in response to the internal combustion engine torque target, and communicating one (and only one) of the contemporaneous performance specification and the internal combustion engine torque target over a datalink. The method further includes, where the energy flux commands include an electric motor torque target and a battery power flux target, controlling an electric system in response to the electric motor torque target and the battery power flux target, where the electric motor torque target and the battery power flux target are not communicated over the datalink. In certain embodiments, interpreting the contemporaneous performance specification includes determining a torque output requirement for the hybrid power train, where the torque output requirement may be an operator torque demand. An exemplary communicating operation includes providing an asynchronous message to the datalink.

Yet another exemplary set of embodiments is a method, including manufacturing a first assembly. The first assembly includes an application requirements module and an energy partitioning module. The application requirements module interprets a contemporaneous performance specification. The energy partitioning module provides an electric motor torque target, a battery power flux target, and an internal combustion engine torque target. The method further includes manufacturing a second assembly that includes an engine control module. The engine control module controls an internal combustion engine in response to the internal combustion engine torque target. The method further includes integrating the first assembly and the second assembly with a third assembly to form a completed hybrid power train. The third assembly includes a datalink that receives the internal combustion engine torque target from the first assembly and provides the internal combustion engine torque target to the second assembly.

In certain embodiments, the completed hybrid power train includes an electric motor and the internal combustion engine, and the method further includes operating the electric motor in response to the electric motor torque target and operating the internal combustion engine in response to the internal combustion engine torque target. In certain embodiments, the datalink includes an asynchronous datalink. In certain embodiments, the completed hybrid power train includes an electric motor/generator and the internal combustion engine, and the method further includes operating the electric motor/generator in response to the electric motor torque target and the battery power flux target. The method still further includes operating the internal combustion engine in response to the internal combustion engine torque target.

Yet another exemplary set of embodiments includes a system having a powertrain controller that interprets a torque output requirement for a hybrid power train system. The system further includes a hybrid controller that determines an energy flux partition for an internal combustion engine and for an electric motor and/or an electric motor/generator in response to the torque output requirement. The system further includes an engine controller that controls an engine in response to the energy flux partition for the internal combustion engine. The hybrid controller is included within a single computing device, with only one of the powertrain controller and the engine controller also within the single computing device. In certain embodiments, the hybrid controller communicates with whichever device from the powertrain controller and the engine controller that is not within the single computing device, where the communication is over an asynchronous datalink. In certain embodiments of the system, a serial execution cycle including operations of the powertrain controller, the hybrid controller, and the engine controller includes only one asynchronous datalink communication.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
   an application requirements module structured to interpret a contemporaneous performance specification;
   an energy partitioning module structured to provide a plurality of energy flux commands in response to the contemporaneous performance specification, wherein a first one of the energy flux commands comprises an internal combustion engine torque target;
   an engine control module structured to control an internal combustion engine in response to the internal combustion engine torque target;
   a datalink positioned in only one location selected from:
   interposed between the application requirements module and the energy partitioning module; and
   interposed between the energy partitioning module and the engine control module.

2. The system of claim 1, wherein the datalink is interposed between the application requirements module and the energy partitioning module, wherein the contemporaneous performance specification passes to the energy partitioning module over the datalink.

3. The system of claim 1, wherein the datalink is interposed between the energy partitioning module and the engine control module, wherein the internal combustion engine torque target passes to the engine control module over the datalink.

4. The system of claim 1, wherein the application requirements module is positioned on a first electronic controller, wherein the energy partitioning module and the engine control module are positioned on a second electronic controller, and wherein the datalink comprises a controller-area network.

5. The system of claim 4, further comprising a first assembly including the first electronic controller positioned at a first manufacturing facility, a second assembly including the second electronic controller positioned at a second manufacturing facility, and a third assembly structured to receive the first assembly and the second assembly to form a completed hybrid power train, the third assembly positioned at a third manufacturing facility.

6. The system of claim 1, wherein the application requirements module and the energy partitioning module are positioned on a first electronic controller, and wherein the engine control module is positioned on a second electronic controller, and wherein the datalink comprises a controller-area network.

7. The system of claim 6, further comprising a first assembly including the first electronic controller positioned at a first manufacturing facility, a second assembly including the second electronic controller positioned at a second manufacturing facility, and a third assembly structured to receive the first assembly and the second assembly to form a completed hybrid power train, the third assembly positioned at a third manufacturing facility.

8. The system of claim 1, wherein the contemporaneous performance specification is updated at a rate greater than or equal to 50 Hz, and wherein the datalink is asynchronous.

9. The system of claim 1, wherein at least one of the contemporaneous performance specification and the energy flux commands are updated at a rate greater than or equal to 50 Hz, and wherein the datalink is asynchronous.

10. The system of claim 1, wherein a second one of the energy flux commands is an electric motor torque target, the system further comprising an electric motor responsive to the electric motor torque target.

11. The system of claim 10, wherein the energy flux commands further comprise at least one command selected from the commands consisting of: a battery storage target, an electric generator torque target, and an accessory energy transfer target.

12. A system, comprising:
a primary electronic controller in communication with an external electronic controller over a datalink, wherein the external electronic controller provides a supplementary control command to the datalink; and
wherein the primary electronic controller comprises:
an application requirements module structured to interpret a contemporaneous performance specification;
an energy partitioning module structured to provide a plurality of energy flux commands in response to the contemporaneous performance specification, wherein a first one of the energy flux commands comprises an internal combustion engine torque target;
a supplementary control module structured to interpret the supplementary control command and to adjust at least one of the contemporaneous performance specification and the energy flux commands in response to the supplementary control command; and
an engine control module structured to control an internal combustion engine in response to the internal combustion engine torque target.

13. The system of claim 12, wherein the datalink is an asynchronous datalink.

14. The system of claim 13, wherein at least one of the energy flux commands, the contemporaneous performance specification, and the supplementary control command is updated at a rate greater than or equal to 50 Hz.

15. The system of claim 12, wherein the external electronic controller comprises a transmission controller.

16. The system of claim 12, wherein the external electronic controller comprises at least one controller selected from the controllers consisting of: a pump controller, a brake controller, a collision avoidance controller, and a power take-off device controller.

17. A method, comprising:
interpreting a contemporaneous performance specification for a hybrid power train;
providing a plurality of energy flux commands in response to the contemporaneous performance specification, wherein a first one of the energy flux commands comprises an internal combustion engine torque target;
controlling an internal combustion engine in response to the internal combustion engine torque target; and
communicating only one of the contemporaneous performance specification and the internal combustion engine torque target over a datalink.

18. The method of claim 17, wherein the plurality of energy flux commands further comprise an electric motor torque target and a battery power flux target, the method further comprising controlling an electric system in response to the electric motor torque target and the battery power flux target, wherein the electric motor torque target and the battery power flux target are not communicated over the datalink.

19. The method of claim 17, wherein interpreting the contemporaneous performance specification comprises determining a torque output requirement for the hybrid power train.

20. The method of claim 19, wherein the torque output requirement comprises an operator torque demand.

21. The method of claim 17, wherein the communicating comprises providing an asynchronous message to the datalink.

22. A method, comprising:
manufacturing a first assembly including:
an application requirements module structured to interpret a contemporaneous performance specification; and
an energy partitioning module structured to provide an electric motor torque target, a battery power flux target, and an internal combustion engine torque target;
manufacturing a second assembly including an engine control module structured to control an internal combustion engine in response to the internal combustion engine torque target;
integrating the first assembly and the second assembly with a third assembly to form a completed hybrid power train, the third assembly including a datalink structured to receive the internal combustion engine torque target from the first assembly and to provide the internal combustion engine torque target to the second assembly.

23. The method of claim 22, wherein the completed hybrid power train includes an electric motor and the internal combustion engine, the method further comprising operating the electric motor in response to the electric motor torque target and operating the internal combustion engine in response to the internal combustion engine torque target.

24. The method of claim 23, wherein the datalink comprises an asynchronous datalink.

25. The method of claim 22, wherein the completed hybrid power train includes an electric motor/generator and the internal combustion engine, the method further comprising operating the electric motor/generator in response to the electric motor torque target and the battery power flux target, and operating the internal combustion engine in response to the internal combustion engine torque target.

26. A system, comprising:
a powertrain controller structured to interpret a torque output requirement for a hybrid power train system;
a hybrid controller structured to determine an energy flux partition for an internal combustion engine and one of an electric motor and an electric motor/generator in response to the torque output requirement;
an engine controller structured to control an engine in response to the energy flux partition for the internal combustion engine; and
wherein the hybrid controller is included within a single computing device with only one of the powertrain controller and the engine controller.

27. The system of claim 26, wherein the hybrid controller communicates with the one of the powertrain controller and the engine controller that is not within the single computing device over an asynchronous datalink.

28. The system of claim 26, wherein a serial execution cycle including operations of the powertrain controller, the hybrid controller, and the engine controller includes only one asynchronous datalink communication.

* * * * *